April 10, 1956  W. R. HOLMES ET AL  2,741,584
PROCESS AND APPARATUS FOR CONCENTRATING HYDROGEN PEROXIDE
Filed Jan. 29, 1952
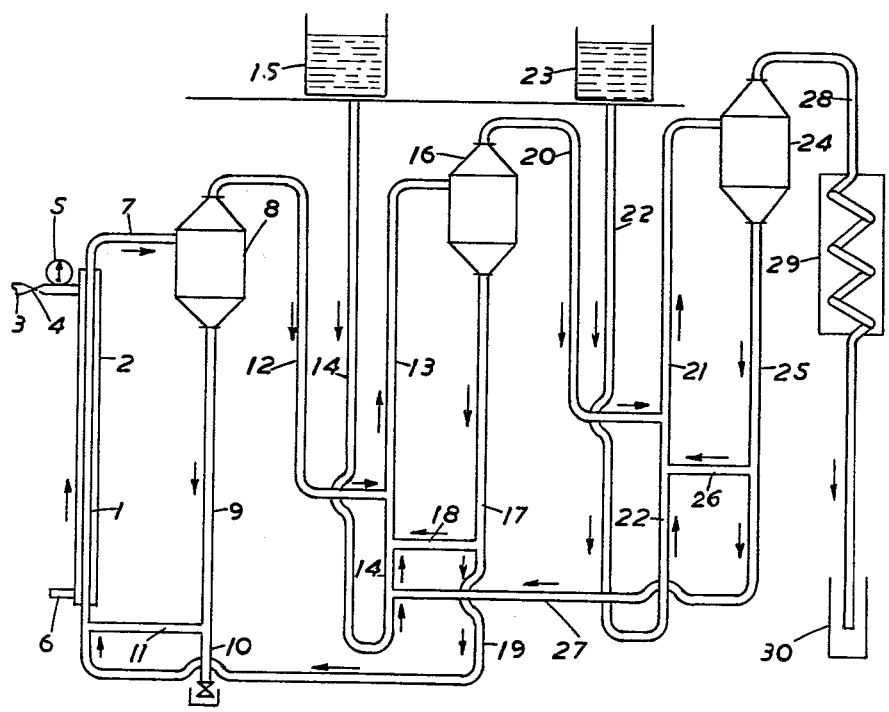
Inventors
William Raymond Holmes
Charles Stanley Godfrey
By
Attorney United States Patent Office 2,741,584
Patented Apr. 10, 1956

2,741,584

PROCESS AND APPARATUS FOR CONCENTRATING HYDROGEN PEROXIDE

William Raymond Holmes and Charles Stanley Godfrey, Luton, England, assignors to Laporte Chemicals Limited, Luton, England, a British company Application January 29, 1952, Serial No. 268,714

Claims priority, application Great Britain March 7, 1951

12 Claims. (Cl. 202—64)

This invention relates to a process and apparatus for concentrating liquids and is particularly concerned with the concentration of hydrogen peroxide solutions.

A number of methods have previously been proposed for the concentration of hydrogen peroxide. Thus, for example, it is possible to concentrate it by bulk evaporation in vacuo. This, however, results in large losses of the vapour. On the other hand, the main method in use, hitherto, has been to vaporise the hydrogen peroxide solution and then to fractionate the vapours in a large packed stoneware column fitted with reflux condensers and working under vacuum. This latter method consists in passing a vapour containing hydrogen peroxide upwards through a vertical column packed with relatively small bodies such as, for example, Raschig rings. Then the liquid, produced either by condensing part of the vapour leaving the top of the column or by direct introduction of water or dilute hydrogen peroxide solution, is introduced at the top of the column and flows downwards through the packing which causes a more or less intimate contact with the vapour and promotes the attainment of a state of thermodynamic equilibrium between the two phases. The disadvantages of the method are:

(1) Since the columns must be operated under vacuum they must be larger than would otherwise be the case. They are, therefore, costly, being made of expensive materials, e. g. chemical stoneware.

(2) The greater the height and diameter, the less efficient they are, because of the difficulty of maintaining an even liquid distribution.

(3) Size is limited by fabrication difficulties in stoneware.

(4) Since a large surface of packing material is presented to the liquid there are undesirable possibilities of leaching of impurities.

Another method provides for the distillation of materials in plate columns. These consist of a series of trays, arranged in a column one above another. The trays hold a shallow layer of liquid and the vapour is forced to bubble through the liquid layers by passing it through vertical pipes whose upper ends are covered by bubble caps whose lower edges dip below the liquid. As in the case of packed columns, liquid descends and vapour ascends the column.

Such columns are not used for hydrogen peroxide for the following reasons:

(1) Columns of inordinate diameter would be required in order to keep the vapour velocity below the loading point of the trays.

(2) The trays hold a considerable volume of liquid which would lengthen the time it was in process and thereby tend to increase the proportion of hydrogen peroxide lost by decomposition.

It has now been found according to this invention that it is possible to concentrate hydrogen peroxide solutions by means of a series of tubes and without the use of fractionating columns, and thus the present invention is based upon obtaining equilibrium between the vapour and the liquid in tubes instead of by the use of the more usual packed or plate columns.

Accordingly the process of the present invention for the concentration of hydrogen peroxide comprises passing the hydrogen peroxide solution to be concentrated in co-current flow with hot vapour up a tube, passing the mixture of vapour and liquid leaving the tube to a separator where it is separated into a vapour containing hydrogen peroxide and a concentrated liquid containing hydrogen peroxide, returning a part of the concentrated liquid to the lower part of said tube, and removing the remainder from circulation in this particular tube, passing the vapour containing hydrogen peroxide to the lower part of a second tube through which it is passed upwardly in co-current flow with water or a hydrogen peroxide solution which is more dilute than that introduced into said first tube, passing the mixture of vapour and liquid leaving the tube into a second separator where it is separated into a concentrated liquid containing hydrogen peroxide and vapour, returning a part of the concentrated liquid to the lower end of said second tube and another part to the lower end of said first tube or mixing it with the feed liquid of said first tube, the length of each tube being at least ten times its width.

Preferably the length of each tube is at least fifty times its width.

Preferably the vapour for the first tube is provided by passing the part of the concentrated liquid separated in the first separator which is not recirculated to the first tube to the feed inlet of a climbing film evaporator, separating the mixture of liquid and vapour in a separator and using the vapour as a vapour feed for the first tube. The sets of tubes may, if desired, be in parallel which enables a considerable saving of space to be effected since a number of tubes can be bunched together in a larger containing tube.

It will be understood that the system may contain as many sets of tubes and separators with the necessary tubes for recirculating as may be required, but, as indicated above, at least two tubes and separators are required.

It will also be understood that the vapour velocity in the tubes must be at least high enough to carry the liquid up the tube intimately mixed with bubbles of vapour.

Given the amount of feed, it is possible to calculate the heating surface required for its evaporation and from this the height and diameter of the vertical vaporiser or the dimensions of any other form of evaporator can be obtained. If a vertical vaporiser is used it is convenient for the tubes in all other parts of the apparatus to be of approximately the same diameter as that of the vertical vaporiser. This ensures a satisfactory vapour velocity. If, however, a vertical vaporiser is not used, it is still convenient for all tubes to have approximately the same diameter.

At higher vapour velocities the liquid is spread as a film on the walls of the tube as in a climbing film vaporiser and such an arrangement is within the scope of the process of the invention.

The present invention also includes an apparatus for carrying out the process of the invention, comprising an upwardly extending tube having liquid and vapour inlet conduits disposed in the lower part of the tube, a separator connected to the top of the tube, a conduit for returning liquid from the separator to the lower part of the tube and means for removing a part of the liquid from the separator from the circulating system, a vapour conduit connecting the separator to the lower part of a second upwardly extending tube, a separator connected to the top of the second tube, a conduit for returning part of the liquid to the lower part of the second tube and part to the lower part of the first tube or to the liquid inlet conduit thereof, the length of each tube being at least ten times its width.

The first tube may be connected to a climbing film evaporator and associated separator, means being provided for returning a part of the liquid product of the first tube to the feed inlet of the climbing film evaporator and also for connecting the separator associated with the climbing film evaporator to the vapour inlet of the first tube. It is, however, also possible to use a bulk evaporator or indeed any other suitable form of evaporator instead of the climbing film evaporator.

The separator may take any of the known forms, e. g., it may contain baffles or be of a labyrinthine form in order to facilitate deposition of liquid droplets.

The tubes need not be vertical although this is preferable. Thus, they may make any angle with the vertical.

It is most important that the level of liquid in the apparatus should be maintained at a suitable height. Thus, if more liquid is fed to the apparatus than the evaporator can handle the level of the liquid in the apparatus will be too high, and the apparatus will flood. If the level sinks too low, due to too much evaporation, the apparatus may run dry. In order to avoid this it is desirable to have an automatic control of the level connected to the feed.

The invention will now be further described by way of example with reference to the accompanying drawing, which shows an arrangement of apparatus suitable for use in the process of the present invention.

Referring to the drawing, the apparatus comprises a climbing film evaporator 1 having a steam jacket 2 having a steam inlet 3 controlled by valve 4 and fitted with a pressure gauge 5, and a steam outlet 6. The climbing film evaporator is connected by a pipe 7 to a separator 8 having a liquid off-take pipe 9 having a branch 10 for removal of the finished product and a branch 11 for returning liquid to the climbing film evaporator. The separator 8 also has a vapour off-take pipe 12 connected to a tube 13, connected by a pipe 14 to a tank 15 provided with a control cock (not shown in the drawing). The top of the tube 13 is connected to a separator 16, having a liquid off-take pipe 17 having a branch 18 for recirculating liquid to the tube 13 and a branch 19 for returning liquid to the feed inlet of the climbing film evaporator 1. The separator 16 also has a vapour off-take 20 connected to a tube 21 connected by a pipe 22 to a tank 23 provided with a control cock (not shown in the drawing). The top of the tube 21 is connected to a separator 24 having a liquid off-take pipe 25 having a branch 26 for recirculating liquid to the tube 21 and a branch 27 connected to the pipe 14 for recirculating liquid to the tube 13. The separator 24 also has a vapour off-take 28 connected to a condenser 29 and receiver 30.

The apparatus is operated as follows:

The hydrogen peroxide solution to be concentrated is contained in tank 15 and is fed by pipe 14 to tube 13, and the climbing film evaporator 1 is filled with concentrated hydrogen peroxide. The tank 23 contains water or very dilute hydrogen peroxide, e. g. the condensate from receiver 30. The liquid from tank 23 is fed by pipe 22 to tube 21. The hydrogen peroxide in the climbing film evaporator 1 evaporates, due to the heat produced by the steam jacket 2, and weak peroxide vapour passes from the separator 8 into the tube 13 where it reaches approximate equilibrium with the liquid circulating through the tube 13. In doing so, it loses peroxide since the liquid in the tube 13 is weaker than that in the climbing film evaporator 1. This process is repeated in tube 21 and the final vapour can then be discharged through pipe 28, condenser 29, to the receiver 30 without undue loss of peroxide. The concentrated peroxide is removed from the bottom of pipe 10. In order to maintain a constant quantity of liquid in tubes 13 and 21, liquid is led from each of these tubes to the next, i. e. from 21 to 13 and from 13 to 1.

To obtain higher degrees of concentration, the strength of feed can be increased, or if the amount of heat applied to the vaporiser can be increased a more concentrated product will be obtained, but naturally in a smaller quantity. Also, if the heat is increased a greater amount of product can be handled for the same concentration. The same applies if a bulk or any other form of evaporator is used. As an example, it is possible by the process of this invention to raise the concentration of hydrogen peroxide from 3% to 30% in one unit, while in another unit the 30% hydrogen peroxide can be concentrated to 60% hydrogen peroxide.

The operation of the plant is also controlled by the amount of water or very dilute hydrogen peroxide which is fed to the plant from tank 23. Thus, the less water is fed from this tank the greater will be the loss of hydrogen peroxide in the condensate and vice versa. It is necessary to control the amount of feed water from this tank to result in a minimum loss of hydrogen peroxide in the condensate coupled with the strength of the product required and the amount of evaporation.

The process may, for example, be conducted in apparatus constructed of stainless steel, glass, aluminum or other suitable materials. The process may be worked continuously and under atmospheric pressure or reduced pressures, although for higher concentrations of hydrogen peroxide, e. g. 80%, reduced pressures are advisable because of the decomposition at high temperatures. The process of the invention may be applied to the concentration of hydrogen peroxide resulting from any of the usual commercial methods of production. It will not, however, concentrate hydrogen peroxide containing an excessive amount of impurities as these would build up in the apparatus. When this is the case, therefore, the process of the present invention may be used after the hydrogen peroxide has been purified by any of the conventional purification methods.

The following examples, in which the apparatus shown in the drawing was used, illustrate the invention:

1. 93.6 lbs. of 4.46% hydrogen peroxide was fed into the tube 13 where it met hot vapour from the separator 8 coming from the steam-jacketed climbing film evaporator 1. The bottom product from the separator 8 was partly withdrawn as 13.7 lbs. of 28.2% w./w. hydrogen peroxide through pipes 9 and 10 and part was recycled through pipe 11 to the climbing film evaporator 1. The vapour from the tube 13 passed to the separator 16 and the bottom product from this passed through pipe 17 and then part was returned to the base of the climbing film evaporator 1 by pipe 19 and part was recycled to the tube 13 by pipe 18. The overhead product from the separator 16 went to the third tube 21 and to the base of this 24.2 lbs. of condensate (0.09% of hydrogen peroxide) were fed from tank 23 which was supplied from the receiver 30. The vapour from tube 21 passed to separator 24 and the overhead product from this was condensed in the condenser 29 and flowed into the receiver 30. The condensate contained 0.09% of hydrogen peroxide, the quantity being 105.3 lbs. The bottom product from separator 24 was partly returned to tube 13 by pipe 27 and partly recycled to tube 21 by pipe 26. The percentage of the hydrogen peroxide fed to the plant decomposed in the process was 2.5% and the percentage of the hydrogen peroxide fed to the plant recovered as concentrated product was 92.5%. In the above example the apparatus was worked at atmospheric pressure.

2. 41.9 lbs. of 4.06% hydrogen peroxide was fed into the tube 13 where it met hot vapour from the separator 8 coming from the steam-jacketed climbing film evaporator 1. The bottom product from the separator 8 was partly withdrawn as 6.95 lbs. of 21.0% w./w. hydrogen peroxide through pipes 9 and 10 and part was recycled through pipe 11 to the climbing film evaporator 1. The vapour from the tube 13 passed to the separator 16 and the bottom product from this passed through pipe 17 and then part was returned to the base of the climbing film evaporator 1 by pipe 19 and part was recycled to the tube 13 by pipe 18. The overhead product from the separator 16 went to the third tube 21 and to the base of this 30.7 lbs. of condensate (0.10% of hydrogen peroxide) were fed from tank 23 which was supplied from the receiver 30. The vapour from tube 21 passed to separator 24 and the overhead product from this was condensed in the condenser 29 and flowed into the receiver 30. The condensate contained 0.10% of hydrogen peroxide, the quantity being 63.5 lbs. The bottom product from separator 24 was partly returned to tube 13 by pipe 27 and partly recycled to tube 21 by pipe 26. The percentage of the hydrogen peroxide fed to the plant decomposed in the process was 10.3% and the percentage of the hydrogen peroxide recovered as concentrated product was 85.8%.

3. 72 lbs. of 4.16% hydrogen peroxide was fed into the tube 13 where it met hot vapour from the separator 8 coming from the steam-jacketed climbing film evaporator 1. The bottom product from the separator 8 was partly withdrawn as 10.4 lbs. of 25.1% w./w. hydrogen peroxide through pipes 9 and 10 and part was recycled through pipe 11 to the climbing film evaporator 1. The vapour from the tube 13 passed to the separator 16 and the bottom product from this passed through pipe 17 and then part was returned to the base of the climbing film evaporator 1 by pipe 19 and part was recycled to the tube 13 by pipe 18. The overhead product from the separator 16 went to the third tube 21 and to the base of this 25.4 lbs. of condensate (0.08% of hydrogen peroxide) were fed from tank 23 which was supplied from the receiver 30. The vapour from tube 21 passed to separator 24 and the overhead product from this was condensed in the condenser 29 and flowed into the receiver 30. The condensate contained 0.12% of hydrogen peroxide, the quantity being 80.9 lbs. The bottom product from separator 24 was partly returned to tube 13 by pipe 27 and partly recycled to tube 21 by pipe 26. The percentage of the hydrogen peroxide fed to the plant decomposed in the process was 8.6% and the percentage of the hydrogen peroxide fed to the plant recovered as concentrated product was 87.2%.

In Examples 2 and 3 the pressure was 3" of mercury.

The present invention has the following advantages:

(1) It obviates the use of stoneware fractionating columns, and allows the use of alternative material of smaller dimensions and with more desirable engineering properties;

(2) The plant for the process can be constructed to hold a small quantity of liquid, thus minimising decomposition;

(3) The process can be worked at atmospheric pressures, thus obviating the need for vacuum installations;

(4) The plant for a given output is much smaller and easier to fabricate and more compact than when fractionating towers are used, since high vapour velocities are not a disadvantage;

(5) A bubble cap column 10 feet in diameter would be required to do the work of a column 3 feet in diameter using the process of the present invention, as this latter column would contain 65 2-inch tubes.

What we claim is:

1. A process for the concentration of hydrogen peroxide which comprises passing the hydrogen peroxide solution to be concentrated in co-current flow with hot vapour up a tube whose length is at least ten times its width, causing said hot vapour to flow at a sufficient velocity to carry said solution therewith mixed with the vapour and for a distance sufficient to establish substantial thermodynamic equilibrium between the liquid and vapor phases of said mixture passing the mixture of vapour and liquid leaving the tube to a separator where it is separated into a vapour containing hydrogen peroxide and a concentrated liquid containing hydrogen peroxide, returning a part of the concentrated liquid to the lower part of said tube and removing the remainder from circulation, passing the vapour containing hydrogen peroxide to the lower part of a second tube whose length is at least ten times its width through which it is passed upwardly in co-current flow with a liquid selected from the group consisting of water and hydrogen peroxide solutions which are more dilute than the hydrogen peroxide introduced into said first tube, causing said vapour to flow at a sufficient velocity to carry said liquid therewith mixed with the vapour and for a distance sufficient to establish substantial thermodynamic equilibrium between the liquid and vapour phases of said mixture, passing the mixture of vapour and liquid leaving the second tube into a second separator where it is separated into a relatively concentrated liquid containing hydrogen peroxide and vapour, returning a part of the relatively concentrated liquid to the lower end of said second tube and feeding another part to the lower end of said first tube.

2. A process for the concentration of hydrogen peroxide which comprises passing the hydrogen peroxide solution to be concentrated in co-current flow with hot vapour up a tube whose length is at least ten times its width, causing said hot vapour to flow at a sufficient velocity to carry said solution therewith mixed with the vapour and for a distance sufficient to establish substantial thermodynamic equilibrium between the liquid and vapor phases of said mixture passing the mixture of vapour and liquid leaving the tube to a separator where it is separated into a vapour containing hydrogen peroxide and a concentrated liquid containing hydrogen peroxide, returning a part of the concentrated liquid to the lower part of said tube and removing the remainder from circulation, passing the vapour containing hydrogen peroxide to the lower part of a second tube whose length is at least ten times its width through which it is passed upwardly in co-current flow with a liquid selected from the group consisting of water and hydrogen peroxide solutions which are more dilute than the hydrogen peroxide introduced into said first tube, causing said vapour to flow at a sufficient velocity to carry said liquid therewith mixed with the vapour and for a distance sufficient to establish substantial thermodynamic equilibrium between the liquid and vapour phases of said mixture, passing the mixture of vapour and liquid leaving the second tube into a second separator where it is separated into a relatively concentrated liquid containing hydrogen peroxide and vapour, returning a part of the relatively concentrated liquid to the lower end of said second tube and feeding another part to the lower end of said first tube by mixing it with the feed liquid of said first tube.

3. A process for the concentration of hydrogen peroxide which comprises passing the hydrogen peroxide solution to be concentrated in co-current flow with hot vapour up a tube whose length is at least fifty times its width, causing said hot vapour to flow at a sufficient velocity to carry said solution therewith mixed with the vapour and for a distance sufficient to establish substantial thermodynamic equilibrium between the liquid and vapor phases of said mixture passing the mixture of vapour and liquid leaving the tube to a separator where it is separated into a vapour containing hydrogen peroxide and a concentrated liquid containing hydrogen peroxide, returning a part of the concentrated liquid to the lower part of said tube and removing the remainder from circulation, passing the vapour containing hydrogen peroxide to the lower part of a second tube whose length is at least fifty times its width through which it is passed upwardly in co-current flow with a liquid selected from the group consisting of water and hydrogen peroxide solutions which are more dilute than the hydrogen peroxide introduced into said first tube, causing said vapour to flow at a sufficient velocity to carry said liquid therewith mixed with the vapour and for a distance sufficient to establish substantial thermodynamic equilibrium between the liquid and vapour phases of said mixture, passing the mixture of vapour and liquid leaving the second tube into a second separator where it is separated into a relatively concentrated liquid containing hydrogen peroxide and vapour, returning a part of the relatively concentrated liquid to the lower end of said second tube and feeding another part of the lower end of said first tube.

4. A process for the concentration of hydrogen peroxide which comprises passing the hydrogen peroxide solution to be concentrated in co-current flow with hot vapour up a tube whose length is at least ten times its width, causing said hot vapour to flow at a sufficient velocity to carry said solution therewith mixed with the vapour and for a distance sufficient to establish substantial thermodynamic equilibrium between the liquid and vapor phases of said mixture passing the mixture of vapour and liquid leaving the tube to a separator where it is separated into a vapour containing hydrogen peroxide and a concentrated liquid containing hydrogen peroxide, returning a part of the concentrated liquid to the lower part of said tube, passing a further part of the concentrated liquid to the feed inlet of a climbing film evaporator to produce a mixture of liquid and vapour, separating said mixture of liquid and vapour in a separator, passing the vapour as a vapour feed to the first tube, passing the vapour containing hydrogen peroxide separated in the separator connected to the first tube to the lower part of a second tube whose length is at least ten times its width through which it is passed upwardly in co-current flow with a liquid selected from the group consisting of water and hydrogen peroxide solutions which are more dilute than the hydrogen peroxide introduced into said first tube, causing said vapour to flow at a sufficient velocity to carry said liquid therewith mixed with the vapour and for a distance sufficient to establish substantial thermodynamic equilibrium between the liqud and vapour phases of said mixture, passing the mixture of vapour and liquid leaving the second tube into a second separator where it is separated into a relatively concentrated liquid containing hydrogen peroxide and vapour, returning a part of the relatively concentrated liquid to the lower end of said second tube and feeding another part to the lower end of said first tube.

5. An apparatus for concentrating hydrogen peroxide comprising an upwardly extending tube whose length is at least ten times its width and having liquid and vapour inlet conduits disposed in the lower part of the tube, a separator connected to the top of the tube, a conduit for returning liquid from the separator to the lower part of the tube, means for removing a part of the liquid from the separator from the circulating system, a vapour conduit connecting the separator to the lower part of a second upwardly extending tube whose length is at least ten times its width, a separator connected to the top of the second tube, and a conduit for returning part of the liquid to the lower part of the second tube and part to the lower part of the first tube.

6. An apparatus for concentrating hydrogen peroxide comprising an upwardly extending tube whose length is at least fifty times its width and having liquid and vapour inlet conduits disposed in the lower part of the tube, a separator connected to the top of the tube, a conduit for returning liquid from the separator to the lower part of the tube, means for removing a part of the liquid from the separator from the circulating system, a vapour conduit connecting the separator to the lower part of a second upwardly extending tube whose length is at least fifty times its width, a separator connected to the top of the second tube, and a conduit for returning part of the liquid to the lower part of the second tube and part to the lower part of the first tube.

7. An apparatus for concentrating hydrogen peroxide comprising an upwardly extending tube whose length is at least ten times its width and having liquid and vapour inlet conduits disposed in the lower part of the tube, a separator connected to the top of the tube, a conduit for returning liquid from the separator to the lower part of the tube, an evaporator and associated separator connected to said first tube, means to return a part of the liquid product of the first tube to the feed inlet of said evaporator, means for connecting the separator associated with said evaporator to the vapour inlet of said tube, a vapour conduit connecting the separator connected to said tube to the lower part of a second upwardly extending tube whose length is at least ten times its width, a separator connected to the top of the second tube and a conduit for returning part of the liquid to the lower part of the second tube and part to the lower part of the first tube.

8. An apparatus for concentrating hydrogen peroxide comprising an upwardly extending tube whose length is at least ten times its width and having liquid and vapour inlet conduits disposed in the lower part of the tube, a separator connected to the top of the tube, a conduit for returning liquid from the separator to the lower part of the tube, a climbing film evaporator and associated separator connected to said first tube, means to return a part of the liquid product of the first tube to the feed inlet of said climbing film evaporator, means for connecting the separator associated with said climbing film evaporator to the vapour inlet of said tube, a vapour conduit connecting the separator connected to said tube to the lower part of a second upwardly extending tube whose length is at least ten times its width, a separator connected to the top of the second tube and a conduit for returning part of the liquid to the lower part of the second tube and part to the lower part of the first tube.

9. An apparatus for concentrating hydrogen peroxide comprising an upwardly extending vertical tube whose length is at least ten times its width and having liquid and vapour inlet conduits disposed in the lower part of the tube, a separator connected to the top of the tube, a conduit for returning liquid from the separator to the lower part of the tube, means for removing a part of the liquid from the separator from the circulating system, a vapour conduit connecting the separator to the lower part of a second upwardly extending vertical tube whose length is at least ten times its width, a separator connected to the top of the second tube and a conduit for returning part of the liquid to the lower part of the second tube and part to the lower part of the first tube.

10. A process for the concentration of an aqueous solution of hydrogen peroxide comprising introducing a first relatively dilute aqueous solution of hydrogen peroxide into the lower section of a first upwardly extending, elongated, unobstructed contacting zone having a length at least ten times its width, introducing into the lower section of said first zone relatively hot first vapor containing steam and hydrogen peroxide and causing said vapor to travel upwardly through said zone in direct co-current contact with said first solution at a sufficient velocity to carry said first solution therewith mixed with bubbles of the vapor and to establish substantial thermodynamic equilibrium between the liquid and vapor phases of said mixture in said first zone, withdrawing the resulting mixture overhead from said first zone and separating it into a second vapor containing hydrogen peroxide and a first liquid more concentrated with respect to hydrogen peroxide than said first solution, introducing at least a part of said first liquid into a vaporization zone, vaporizing said first liquid in said vaporization zone, withdrawing overhead from said vaporization zone a second mixture comprising relatively hot first vapor and a second liquid, separating said relatively hot first vapor and said second liquid, withdrawing at least a part of said second liquid as concentrated hydrogen peroxide product, introducing a second dilute aqueous solution of hydrogen peroxide into the lower section of a second upwardly extending, elongated, unobstructed contacting zone, having a length at least ten times its width, said second solution being less concentrated with respect to hydrogen peroxide than said first solution, introducing into the lower section of said second contacting zone said second vapor and causing said second vapor to travel upwardly through said second zone in direct co-current contact with said second solution at a sufficient velocity to carry said second solution therewith mixed with bubbles of the vapor to establish substantial thermodynamic equilibrium between said second solution and said second vapor in said second zone, withdrawing the resulting mixture overhead from said second zone and separating it into a third vapor and a third liquid more concentrated with respect to hydrogen peroxide than said second solution and introducing at least part of said third liquid into the lower section of said first zone.

11. A process according to claim 10 wherein said first and second contacting zones each have a length at least fifty times its width.

12. A process for the concentration of an aqueous solution of hydrogen peroxide comprising introducing a relatively dilute aqueous solution of hydrogen peroxide into the lower section of an upwardly-extending, elongated, unobstructed contacting zone having a length at least ten times its width, introducing into said aqueous solution in the lower section of said zone relatively hot vapor containing steam and hydrogen peroxide and causing said vapor to travel upwardly through said zone in direct co-current contact with said solution at a sufficient velocity to carry said solution therewith intimately mixed with the vapor and to establish substantial thermodynamic equilibrium between the liquid and vapor phases of said mixture, withdrawing overhead from said zone the resulting mixture of vapor and liquid, separating said mixture of vapor and liquid, said liquid being more concentrated with respect to hydrogen peroxide than said solution, introducing at least a part of said liquid into a vaporization zone, vaporizing said liquid in said vaporization zone, withdrawing overhead from said vaporization zone a mixture comprising relatively hot vapor and a second liquid more concentrated with respect to hydrogen peroxide than said first liquid, withdrawing at least a part of said second liquid as concentrated hydrogen peroxide product, and introducing the relatively hot vapor into said contacting zone in continuation of the concentrating operation.

References Cited in the file of this patent

UNITED STATES PATENTS

| 1,013,791 | Lowenstein | Jan. 2, 1912 |
| 1,536,213 | Halvorsen | May 5, 1925 |
| 1,738,625 | Wietzel et al. | Dec. 10, 1929 |
| 2,298,064 | MacMullin | Oct. 6, 1942 |
| 2,438,252 | Richardson | Mar. 23, 1948 |

FOREIGN PATENTS

| 445,334 | Great Britain | Apr. 7, 1936 |
| 473,343 | Great Britain | Oct. 11, 1937 |